United States Patent [19]

Takiguchi

[11] 4,034,188

[45] July 5, 1977

[54] HEAT FIXING DEVICE FOR COPYING MACHINE

[75] Inventor: Koichi Takiguchi, Ebina, Japan

[73] Assignee: Rank Xerox, Ltd., London, England

[22] Filed: May 24, 1976

[21] Appl. No.: 689,294

[30] Foreign Application Priority Data

July 31, 1975 Japan .............................. 50-092561

[52] U.S. Cl. ................................ 219/216; 219/388; 432/227

[51] Int. Cl.² ..................... H01B 1/00; C03G 15/20

[58] Field of Search ......... 219/216, 388; 355/3 FU; 432/59, 227

[56] References Cited

UNITED STATES PATENTS

| | | | |
|---|---|---|---|
| 3,053,962 | 9/1962 | Cerasani et al. | 215/216 |
| 3,219,799 | 11/1965 | Trumbull et al. | 215/216 X |

OTHER PUBLICATIONS

Electrostatic Copier, Research Disclosure, July 1975, 13526, p. 19.

*Primary Examiner*—C. L. Albritton

[57] ABSTRACT

A hot-air or radiant heat fixing device for copying machines wherein the device is provided with either a hot-air generating means or a radiant source of energy for elevating the temperature of toner images carried by support material to thereby effect coalescence of the toner particles forming the images to render them tacky.

A corona discharge device is disposed intermediate the hot air or radiant energy source and the supporting body or material carrying the toner images such that the corona discharge generated thereby improves the efficiency of heat transfer from the energy source to the toner material forming the images.

3 Claims, 2 Drawing Figures

HEAT FIXING DEVICE FOR COPYING MACHINE

BACKGROUND OF THE INVENTION

This invention relates to the method and apparatus for heating, drying, or fixing images by means of hot air, or radiant energy and more particularly, to a more efficient method and apparatus for accomplishing fixing of toner images.

The method of drying, heating or fixing images by hot air or radiant energy sources is well known. However, since hot air or radiant energy devices require a large size blower or source of radiant energy, they do not represent the preferred devices for fusing toner images.

Accordingly, the principal object of this invention is to provide an improved and more efficient hot air fuser for fixing toner images to copy substrates.

It is a more particular object of this invention to provide an improved fuser utilizing electrostatic discharge for improving the efficiency of heat transfer from an energy source to the toner material forming images on the support material.

BRIEF SUMMARY OF THE INVENTION

The above-cited objects of the present invention are accomplished by the provision of a hot-air fuser or radiant energy fuser wherein a corona discharge device is disposed intermediate the hot air or radiant energy source and the support material for the toner images to thereby improve the efficiency of the heat transfer from either the hot air or the radiant energy source.

Other objects and advantages of the present invention will become apparent when read in conjunction with the accompanying drawings wherein.

DETAILED DESCRIPTION OF THE PREFERRED EMBODIMENT

Figure 1:
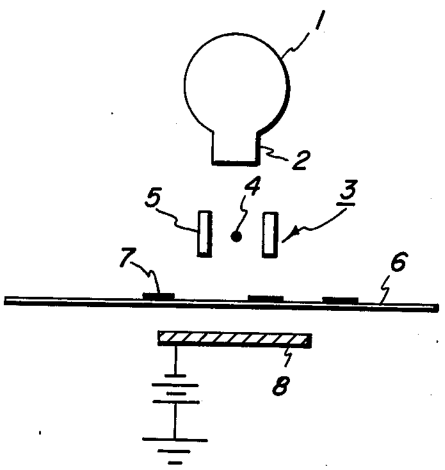
FIG. 1 is a schematic representation of one embodiment of the invention.

Now, the present invention will be described in more detail with reference to an embodiment as shown in the accompanying drawings. In the drawings (FIG. 1) there is shown at 1, a hot-air blowing device, hot air being adapted to move through a blowing outlet 2 opening downwardly, and shown at 4 is a wire of a corona discharge device 3 provided beneath the blowing outlet 2. Designated at 5 are shield plates which are provided at both sides of the wire 4 and movably provided beneath the wire 4 is a supporting body 6 which carries thermoplastic powder images 7 formed on the upper surface thereof. Provided beneath the supporting body 6 is a rear electrode 8 which is positioned right underneath the aforesaid wire 4 and direct current voltage of minus 250 volts is adapted to be impressed to the rear electrode.

Thus, in fixing the thermoplastic powder images 7 on the supporting body 6, when a direct voltage of 5 KV is impressed to the wire 4 the corona discharge device 3 with the hot air being blown from the hot air blowing device 1, the ions generated in the corona discharge device 3 reach onto the support body 6 together with the hot air to promote heat fixing of the thermoplastic powder images 7 on the supporting body 6 to thereby enable heat fixing in a short time.

When the thermoplastic powder images 7 were heat fixed in such an arrangement as described above without the use of corona discharging device 3, the heating speed of the supporting body when good fixing was obtained was 10 centimeters/second. In contrast thereto, when heat fixing was conducted while ions were being generated by the corona discharge device 3, good results were obtained in the heat fixing even when the feeding speed of the supporting body 6 was 25 centimeters per second. At the same feeding speed of the supporting body 6, like results were obtained in fixing both in the case that corona discharge was done under the condition of hot-air temperature of 150° C and in the case that corona discharge was not done under the condition of hot air of 200° C. This apparently teaches that the efficiency of heat-transfer is remarkably improved by the provision of the corona discharge device 3.

Figure 2:
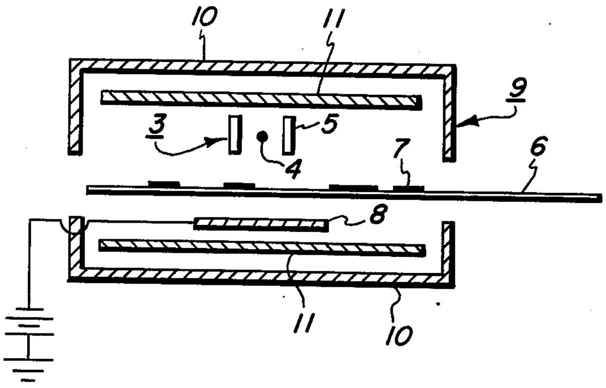
FIG. 2 is a schematic representation showing another embodiment of the invention.

Meanwhile, another embodiment of the present invention is illustrated in FIG. 2 in which heating elements 11 are provided within an oven 10 of conventional type numerically spaced manner in a wire 4, shields 5, a supporting body 6 carrying toner plastic powder images and a rear electrode 8 are provided between those heating elements 11 in the same manner as mentioned above. In such an arrangement, the heat generated from the upper heating element 11 is enhanced in its efficiency by the corona discharge device 3 and is reached through the thermoplastic powder images 7 on supporting body 6 to heat-fix those images.

When the temperature in the oven 10 was maintained at 200° C, good results in fixing were obtained without the use of corona discharge when the feeding speed of the supporting body 6 was 5 centimeters/second. Meanwhile when the temperature in the oven 10 was the same and plus 5 KV was impressed to the wire 4 and minus 250 volts was impressed to the rear electrode 8 good fixing was obtained even when the feeding speed of the supporting body was 15 centimeters/-second.

As is apparent from the foregoing description, according to the present invention, efficiency of heat-transfer is improved by providing a corona discharge device near the source of hot wind and therefore, heating, drying and fixing of images by hot wind may be done with no use of large-sized hot-wind generating apparatus.

In the aforesaid embodiment, although plus voltage was impressed at the wire 4 of the corona discharge device 3, it may be, of course, negative voltage and the wire 4 may a a needle electrode.

While the invention was described with respect to the preferred embodiments, it will be apparent that certain modifications and changes can be made without departing from the spirit and scope of the invention and it is therefore intended that the foregoing disclosure be limited only by the claims appended hereto.

What is claimed is:

1. Fuser apparatus for fixing toner images to support body, said apparatus comprising:
   - a source of thermal energy for causing the toner forming said images to coalesce and become tacky; and
   - means interposed between said source of thermal energy and said support body for improving the efficiency of heat transfer from said thermal energy source to said toner, said means for improving a heat transfer efficiency comprising: a corona discharge device.

2. Apparatus according to claim 1 wherein said source of thermal energy comprises a hot-air blower.

3. Apparatus according to claim 1 wherein said source of thermal energy comprises a radiant heater.

* * * * *